D. HARKNESS.
Grain Rake.
No. 4,422.  Patented March 14, 1846.
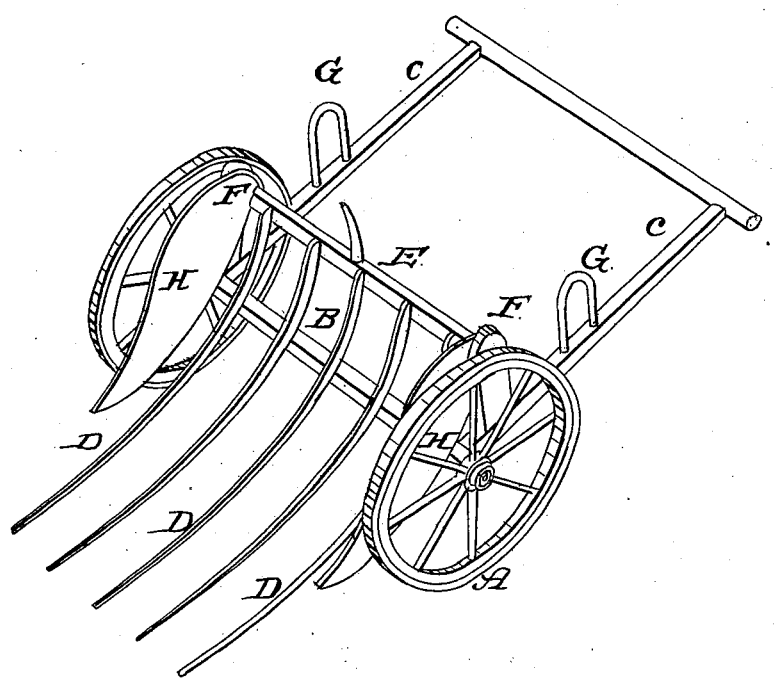

UNITED STATES PATENT OFFICE.

DAVID HARKNESS, OF RAISIN, MICHIGAN.

IMPROVEMENT IN GRAIN-RAKES.

Specification forming part of Letters Patent No. 4,422, dated March 14, 1840.

*To all whom it may concern:*

Be it known that I, DAVID HARKNESS, of Raisin, in the county Lenawee and State of Michigan, have invented a new and useful Improvement in the Manner of Constructing a Wheeled Rake for the Raking of Grain; and I do hereby declare that the following is a full and exact description thereof.

My grain-rake is run upon wheels in the manner of some other rakes for a like purpose. The teeth or fingers are to be fastened into an independent head or shaft in the rear of the axle instead of into the axle, as is ordinarily done. The shaft carrying the rake-teeth turns on gudgeons within suitable bearings at its ends, and when the handles of the machine are in the proper position for advancing it the outer ends of the rake-teeth rest upon the ground in position for collecting the grain. The upper end of the teeth are then clear of the axle, and when a sufficient quantity of grain has been collected to form a sheaf or to be otherwise disposed of the attendant depresses the handles, and thereby brings the teeth into contact with the axle, which then forms a fulcrum or bearing upon which they are made to rise, so as to lift the grain to the desired height.

In the accompanying drawing, A A are wheels on the axle B. The handles C C, by which the machine is to be moved forward, are made fast to the axle B.

The rake teeth or fingers D D are made fast to an independent shaft or rake-head, E, on the ends of which there are gudgeons that turn in the standards F F, attached to the handles C C. In the position in which the respective parts are represented the rake-teeth rest upon ground, the handles being in a horizontal position, or nearly so, and the upper end of the fingers just free from the axle. From the fact of the teeth D being attached to the head or shaft E that works on gudgeons, the teeth are perfectly free to follow the undulations of the ground. If the handles C C be depressed, the teeth will be made to bear upon the main axle B, and they, with the grain upon them, may be raised to any desired height.

G G are bows, which may be placed upon the handles, for holding any stuff to bind the sheaves, if desired.

H H are boards or cheeks, which I sometimes use, although they are not absolutely necessary. They are attached to the shaft or head E, and are so formed on their lower edges as to correspond with that of the rake-teeth. They serve to retain the ends of the grain and keep it from entangling with the wheel.

The machine may be varied in size; but, as a general rule, the wheel may be twenty inches in diameter; the handles, four feet and a half long; the teeth or fingers, two feet and a half. The width of the machine, three feet. The head or shaft of the rake may be about four inches from the axle, which gives a length of bearing sufficient for the easy elevating of the collected grain.

Having thus fully described the nature of my invention in the manner of constructing the grain-rake, what I claim therein as new, and desire to secure by Letters Patent, is—

The affixing of the rake teeth or fingers in a shaft or head, which is made to turn on gudgeons in suitable bearings in rear of the axle in such manner as to cause said axle to become a fulcrum for elevating the collected grain, the respective parts of the machine being arranged for that purpose, substantially in the manner or upon the principle herein fully made known.

DAVID HARKNESS.

Witnesses:
ELIPHALET JONES,
SMITH LAING.